Dec. 23, 1958 F. N. MURDOCH 2,865,106
GEOMETRICAL MEASURING AND DRAFTING INSTRUMENT
Filed June 9, 1955 5 Sheets-Sheet 1
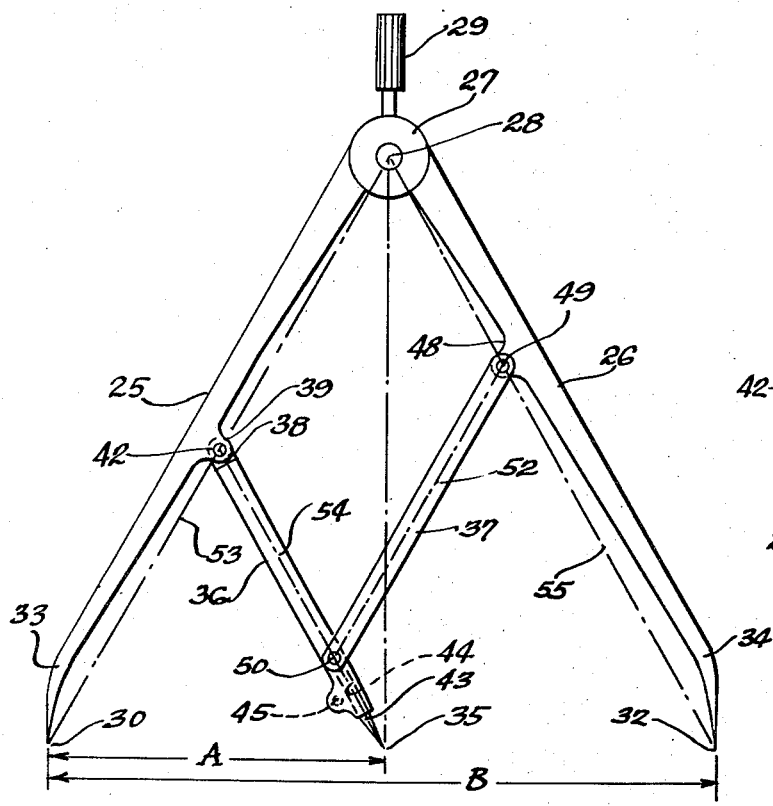
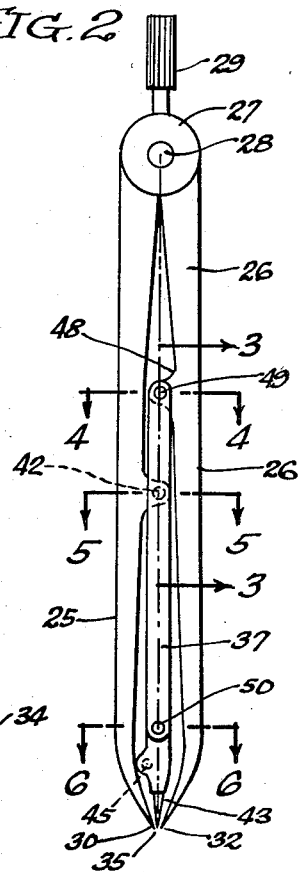
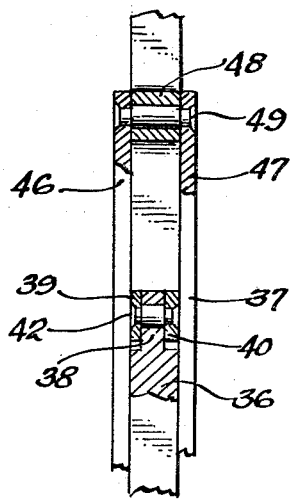
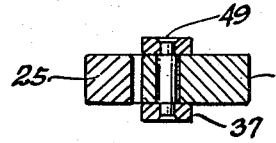
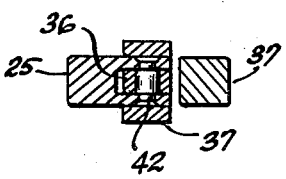
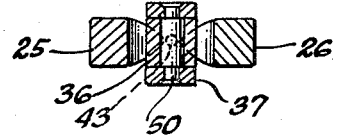
INVENTOR.
Frank N. Murdoch
BY *F. Thrall Brewer*
Attorney Dec. 23, 1958 — F. N. MURDOCH — 2,865,106
GEOMETRICAL MEASURING AND DRAFTING INSTRUMENT
Filed June 9, 1955 — 5 Sheets-Sheet 2

INVENTOR.
Frank N. Murdoch.
BY
Attorney

Dec. 23, 1958  F. N. MURDOCH  2,865,106
GEOMETRICAL MEASURING AND DRAFTING INSTRUMENT
Filed June 9, 1955  5 Sheets-Sheet 3

INVENTOR.
Frank N. Murdoch
BY
Attorney

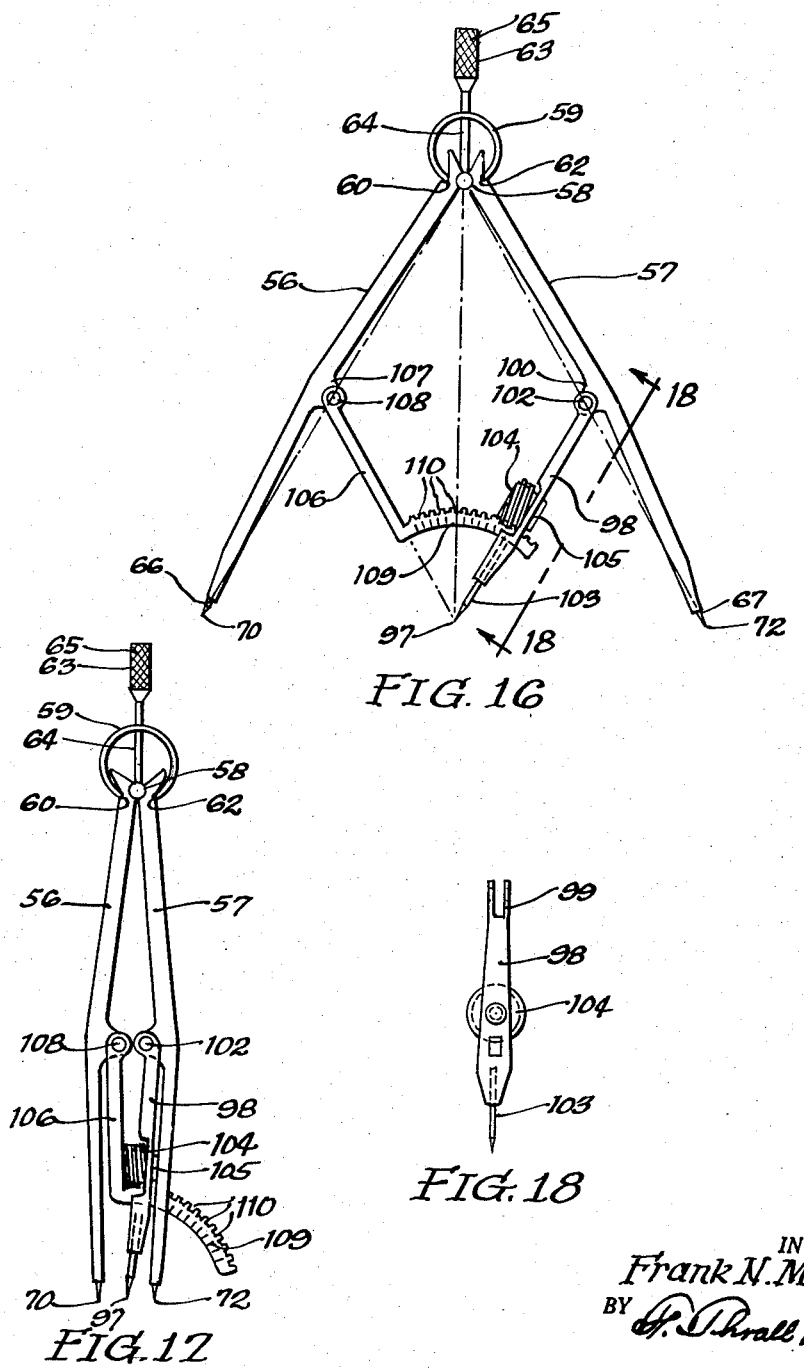

INVENTOR.
Frank N. Murdoch

United States Patent Office 2,865,106
Patented Dec. 23, 1958

2,865,106

GEOMETRICAL MEASURING AND DRAFTING INSTRUMENT

Frank N. Murdoch, Pacific Palisades, Calif.

Application June 9, 1955, Serial No. 514,147

1 Claim. (Cl. 33—150)

This invention relates to geometrical measuring and drafting instruments, and more particularly to an instrument of the divider type having a point in addition to those customarily used and which is supported relative to the others in a manner, and by structure such that it is interposed between said others and maintained in a definite spaced relationship thereto irrespective of the adjusted spacing between the others.

One of the general objects of my invention is to provide an instrument of the divider type which embodies a third point in addition to the two customarily used and having supporting structure for the third point which supports it in a definitely fixed relationship of alignment and proportional spacing between the said two points as the two points are adjusted to various spacings between their limits of movement relative to one another.

As another object, the invention has within its purview the provision of a three point divider wherein one point intervenes between an outer pair and is supported in an aligned and fixed proportional relationship of spacing between the points of the outer pair by links movably connected to the supporting structure for the outer pair and establishing a fixed relationship of movements between the points.

My invention further comprehends the provision of a three point divider having a combination of movably interconnected legs and links for carrying the three points and wherein the legs and links establish and maintain a relationship embodying similar triangles having the divider points at their vertices, thereby to establish a fixed alignment and proportional spacing relationship between the points within the limits of the relative movements of the legs and links.

These and other objects of this invention will become apparent from the following detailed description when taken together with the accompanying five sheets of drawings in which:

Figs. 1 and 2 are each front elevational views of a three point divider incorporating a preferred embodiment of my invention, which views show the operating parts of the divider in different positions;

Fig. 3 is a fragmentary side sectional view drawn to a large scale than Fig. 2, and wherein the section is taken substantially as indicated by a line 3—3 in Fig. 2 and accompanying arrows;

Figures 8, 9:
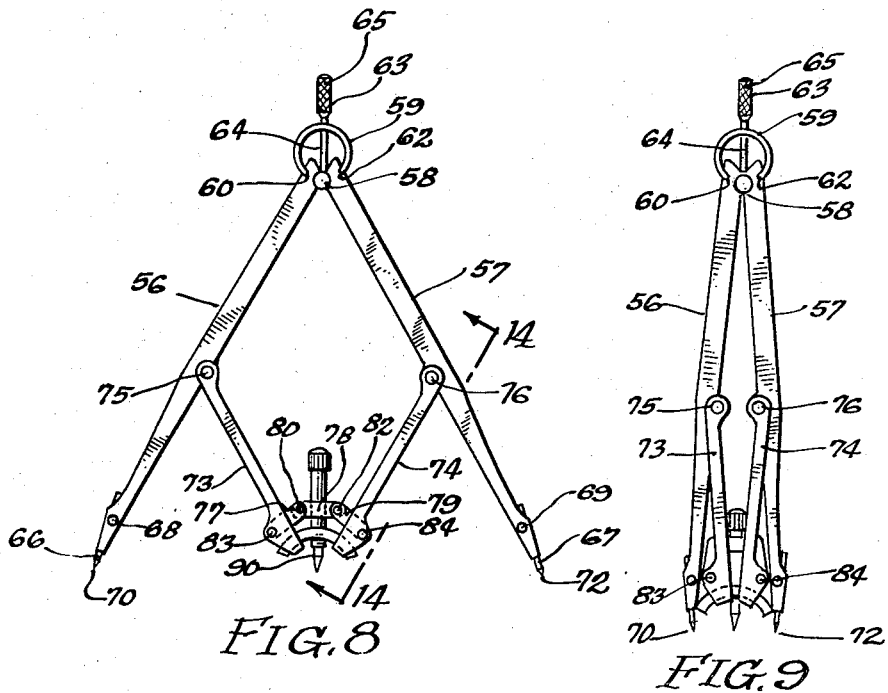
Figure 7:
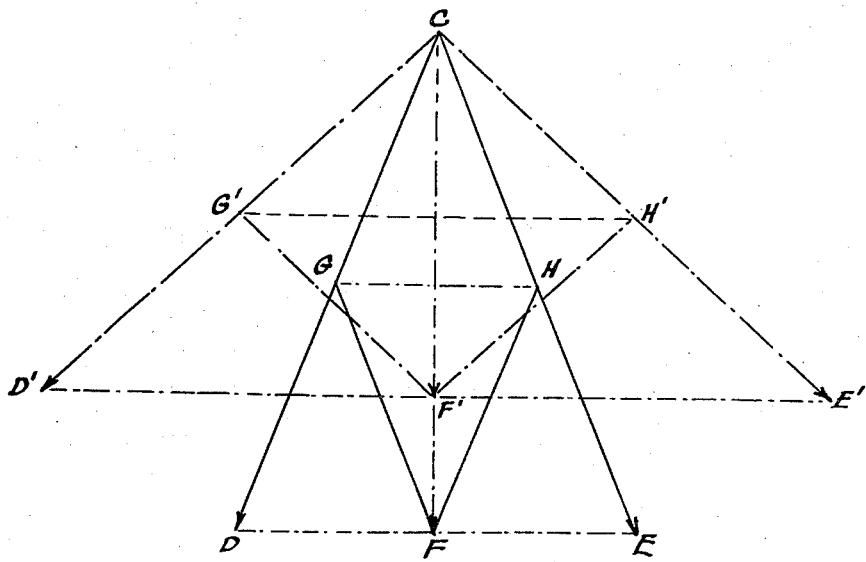
Figures 10, 11:
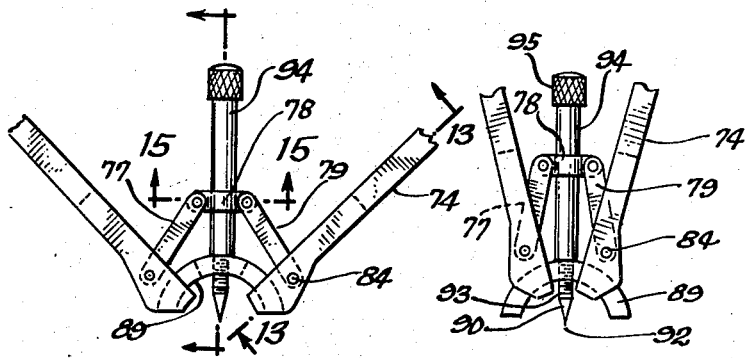
Figures 12, 13, 14:
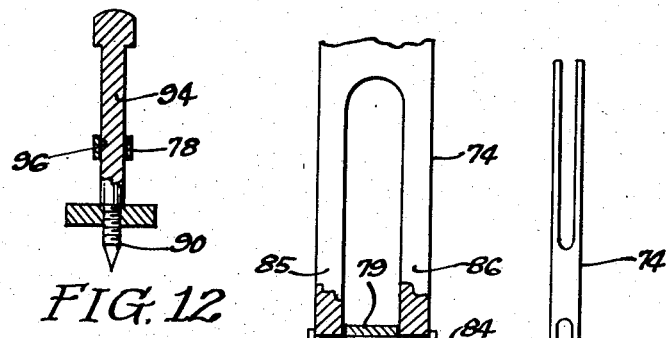
Figure 15:
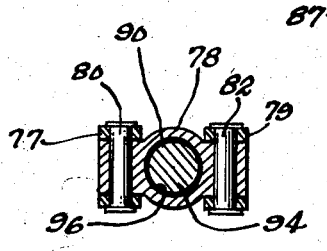
Figure 19:
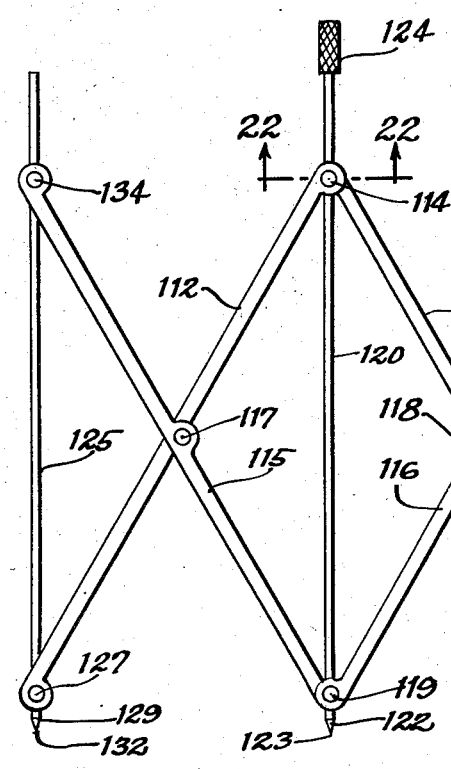
Figure 20:
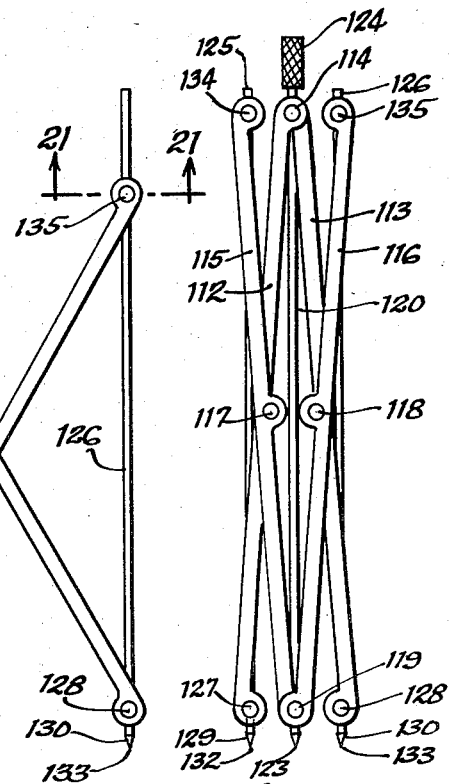
Figure 21:
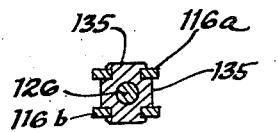
Figure 22:
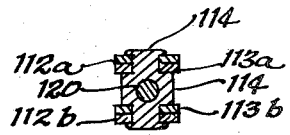

Figs. 4, 5 and 6 are each end sectional views taken substantially at the positions indicated by lines 4—4, 5—5 and 6—6 in Fig. 2, respectively;

Fig. 7 is a geometric diagram depicting principles and details of the operational characteristics of three point dividers herein illustrated;

Figs. 8 and 9 are front elevational views of a three point divider embodying the modification of my invention, wherein the operating parts of the divider are illustrated in different positions in the two views;

Figs. 10 and 11 are fragmentary front elevational views of a portion of the structure illustrated in Figs. 8 and 9, and are drawn to larger scales than Figs. 8 and 9 with the parts shown in different operating positions in the two views;

Fig. 12 is a fragmentary side sectional view of a portion of the structure depicted in Figs. 10 and 11;

Fig. 13 is a fragmentary side sectional view taken substantially as indicated by a line 13—13 and accompanying arrows in Fig. 10, and is drawn to a somewhat larger scale than Fig. 10;

Fig. 14 is a side view taken substantially as indicated by a line 14—14 and accompanying arrows in Fig. 8;

Fig. 15 is an end sectional view taken substantially at the position indicated by a line 15—15 and in the direction of the arrows in Fig. 10, the scale used in Fig. 15 being larger than that of Fig. 10;

Figs. 16 and 17 are front elevational views of another modified form of my three point divider, wherein the operating parts of the divider are shown in different positions;

Fig. 18 is a fragmentary side view taken substantially as indicated by a line 18—18 and accompanying arrows in Fig. 16;

Figs. 19 and 20 are front elevational views of an additional modified embodiment of my invention, wherein the parts are shown in different operating positions; and Figs. 21 and 22 are end sectional views taken respectively as indicated by lines 21—21 and 22—22 in Fig. 19 and in the directions of the arrows, Figs. 21 and 22 being drawn to larger scales than Fig. 19.

In the exemplary embodiments of this invention which are disclosed herein for illustrative purposes, I have, in each of the modified forms, disclosed a three point divider adapted to use by draftsmen, engineers, mechanics and the like, and wherein the three divider points, in addition to maintaining alignment with one another, also have a fixed relationship of spacing, regardless of the positions at which the points are set or adjusted. Each of the dividers illustrated, like the ordinary types of two point dividers now in common use, has two points secured to and carried at the ends of two substantially rigid outer legs, which legs are hingedly connected together at the ends opposite the points for relative swinging movement toward one another in a common plane. In addition, each of the disclosed three point dividers has a third point disposed between the points on the outer legs, in laterally aligned relationship therewith, and supported by movable and connected links from the outer legs, with the parts constructed and arranged to keep the third point in a fixed ratio or relationship of spacing between the outer points, regardless of the positions at which the outer points are adjusted. When desired, the third point may be removed or retracted to permit the use of the instrument as a conventional divider.

Having reference to Figs. 1 to 6 inclusive, the three point divider there illustrated has substantially rigid outer legs 25 and 26 hingedly connected together at adjacent ends by yoke 27 and fastening means, such as a rivet or screw 28 extending through the yoke and adjacent overlapping end portions of the legs 25 and 26. In this arrangement of parts, the legs 25 and 26 extend from the yoke 27 in coplanar relationship and are swingable toward and from one another in that plane and about the axis of the fastening means 28, which axis is substantially perpendicular to the plane of the legs. A handle or grip 29 is secured to, and projects from the yoke 27 in a direction opposed to the general direction in which the legs extend, thereby to facilitate the handling and use of the divider.

In the disclosed structure, the legs 25 and 26 are of the same length and have points 30 and 32 at the ends opposite the yoke 27. In this instance, end portions 33 and 34 of the legs 25 and 26 respectively are curved, so that the points remain more nearly in perpendicular relationship to a surface when the legs are separated and may be set at positions closer together when the legs are brought together.

For supporting a third point 35 in aligned relationship to the points 30 and 32, I have provided a pair of links 36 and 37. The link 36, as shown in Figs. 1, 2 and 3, has an end portion 38 of reduced sectional thickness which fits between spaced inwardly projecting bearing flanges 39 and 40 at the mid-portion of the inner surface of the leg 25; the link being secured in place relative to the bearing bosses 39 and 40 on the leg 25 for swinging movement in the plane of the legs 25 and 26 by fastening means such as a headed cross pin 42. At the other end of the link 36, a pointed element 43, having the point 35 on its extended end, is secured in a slot 44 which extends longitudinally of the link 36 by clamping means, such as a set screw 45. In this instance, and as previously mentioned, the point 35 is adjusted to a position of lateral alignment with the points 30 and 32. The link 37, in the disclosed structure, is composed of two side rails 46 and 47 in spaced and substantially parallel relationship to one another and which are hingedly secured to a projecting boss 48 on the mid-portion of the inner surface of the leg 26 by fastening means, such as a headed pin 49. The other ends of the side rails 46 and 47 which constitute the link 37 are hingedly connected to opposite sides of the link 36 at a position near the pointed element 43 by fastening means, such as a headed cross pin 50.

The lengths of the links 36 and 37 and the positions of the hinged connections of those links to the legs and to one another are selected, so that in the assembly of the structure, the longitudinal axis of the link 37 on which is indicated in Fig. 1 by line 52 passing through the axes of the cross pins 49 and 50 is parallel to a line 53 which extends from the axis of the rivet or screw 28 and the point 30 on the leg 25. Also, the longitudinal axis of the link 36 which extends from the point 35 through the axis of the cross pin 42, as indicated by a line 54 is parallel to a line 55 which extends from the axis of the screw or rivet 28 to the point 32 on the leg 26. Thus, it may be observed that the third or intermediate point is movably supported relative to the legs 25 and 26 by a structure having parts associated in the nature of a parallelogram, whereby the third or intermediate point 35 is maintained in a definite proportional spaced relationship to the spacing of the points 30 and 32, and such that the space A between points 30 and 35 and the space B between the points 30 and 32 are in a constant or fixed ratio to one another. In the structure disclosed, the point 35 bisects the distance between the points 30 and 32.

As depicted in Fig. 7, further principles of my three point dividers, as herein disclosed, can be additionally described and understood diagramatically in terms of triangular relationships. As there depicted, the outer legs of my disclosed dividers are indicated by lines CD and CE, with the axis of the hinged connection between the legs at point C, and the points on the legs at D and E. As disclosed, the legs CD and CE are equal in length. The links supporting the third point at F between the points D and E are hingedly connected to the mid portions of the outer legs at G and H. For simplifying the analysis, the axes of the link connections to the outer legs at G and H may be considered to be at the longitudinal centers of the legs CD and CE respectively.

With this arrangement, and with a predetermined spacing between the legs CD and CE assumed, as depicted by solid lines, and with the third or intermediate point at F adjusted to lateral alignment with the points D and E, the points D, F and E form a line which constitutes the base of an isosceles triangle CDE having equal sides CD and CE. Since the axes of the movable attachment between the links and the side legs at G and H are at the longitudinal centers of the legs CD and CE respectively, and assuming that the distances GF and HF are equal, the point F falls at a position bisecting the distance between the points D and E and the triangles GDF, FGH, HFE and CGH are each isosceles and equal in size. Furthermore, the triangles CFE and CFD are similar right triangles having a common side CF.

When the spacing between the points D and E is changed by varying the angular distance between the legs CD and CE, as indicated in dot and dash lines at CD' and CE', other factors remaining as set forth in the description, the point F' remains aligned with the points D' and E', and the triangles G'D'F', F'G'H', H'F'E' and CG'H' remain isosceles and similar, so that the point F' bisects the distance between the points D' and E'.

In the modified structure illustrated in Figs. 8 to 15 inclusive, substantially rigid side legs 56 and 57 are hingedly connected together at adjacent ends by engagement with a grooved cross pin 58 and are movable toward and away from one another about the axis of the cross pin 58 and in substantially coplanar relationship. Suitably notched end portions of the legs 56 and 57 are held in engagement with the grooved cross pin 58 by a resilient C-clamp 59 having end portions engaged in notches 60 and 62 in the legs 56 and 57 on opposite sides of the grooved cross pin 58. A handle 63, in the disclosed structure, has a stem portion 64 secured to the grooved cross pin 58 and extending through the mid portion of the resilient C-clamp 59, so that a projecting grip portion 65 is exposed in opposed relationship to the legs 56 and 57 for ease of handling the instrument.

At the ends of the legs 56 and 57 opposite the hingedly connected end portions thereof, pointed elements 66 and 67 are adjustably secured in place on the legs 56 and 57 respectively by fastening means, such as thumb screws 68 and 69. These pointed elements 66 and 67 have points 70 and 72 thereon, which points are equally spaced from the axis of the grooved cross pin 58 which constitutes the axis of swinging movements of the legs 56 and 57 relative to one another.

To correspond to the diagrammatic illustration of Fig. 7, links 73 and 74 are hingedly connected to the mid portions of the legs 56 and 57 by fastening means such as headed cross pins 75 and 76 respectively, the axes of which headed cross pins are on lines extending from the points 70 and 72 to the axis of the grooved cross pin 58 and are also equally spaced from the points 70 and 72 respectively. For interconnecting the ends of the links 73 and 74 for relative angular movements in the plane of the legs 56 and 57, I have provided a series of cross links 77, 78 and 79. The links 77 and 79 have ends hingedly connected to the opposite ends of the link 78 by headed cross pins 80 and 82, while the opposite ends of the links 77 and 79 are hingedly connected to end portions of the links 73 and 74 by fastening means such as headed cross pins 83 and 84. As shown in Fig. 15, the end portions of the links 77 and 79 which are connected to the links 78 are bifurcated to straddle opposite end portions of the link 78. The other ends of the links 77 and 79 are of solid section and fit between spaced end portions 85 and 86 of each of the links 73 and 74, as indicated in Figs. 13 and 14 with respect to the link 74.

For stabilizing the links 73 and 74 in their relative angular movements, opposed inner end surfaces of the end portions 85 and 86 have grooves 87 and 88 therein, as illustrated in Figs. 13 and 14, which grooves slidably engage opposite edges and marginal portions of an arcuate member 89. A pointed element 90 having a point 92 thereon and a threaded portion 93 adjacent the points is threaded into the mid-portion of the arcuate member 89, so as to be disposed radially of that arcuate member. The pointed element 90 also has a stem portion 94 projecting from the convex surface thereof, and which stem portion has a knurled knob 95 at its extending end for facilitating adjustment of the point relative to the arcuate member. The stem portion 94 of the pointed element 90 is slidable in a central opening 96 in the link 78. With this arrangement of parts, the pointed element 90 is supported in an adjusted position relative to the links 73 and 74 and in a position of relative alignment with the points 70 and 72. Also, movements of the legs 56 and 57 which produce relative angular movements of the links 73 and 74 produce sliding movements of the link 78 along the stem portion 94 of the pointed element as the grooves in the inner surface of the links 73 and 74 move along the arcuate member 89. The geometric effect of the relative movements of the legs 56 and 57, the links 73 and 74 and the points 70, 72 and 90, for this disclosed structure, is like that depicted diagrammatically in Fig. 7 and similar to that discribed in respect to Fig. 7.

Having reference to the modified embodiments of my invention which is shown in Figs. 16, 17 and 18, some of the parts there depicted are so nearly like those shown and described with respect to the structure of Figs. 8 and 9, that similar reference characters are applied thereto, and it may be understood that those parts perform similar functions in like manners. More specifically, the legs 56 and 57, the parts by which those legs are hingedly connected for movements toward and from one another in a common plane and the attachments of the points, as well as the pointed elements themselves and their adjustments may be considered to be like those described and illustrated in connection with the structure of Figs. 8 and 9.

In this structure of Figs. 16, 17 and 18, the more salient difference from the structure of Figs. 8 and 9 is in the manner of connecting and effecting relative angular movements of the links which support a third point 97 between and in a fixed ratio of spacing to the points 70 and 72. As disclosed, a link 98 has a bifurcated end portion 99 which straddles a projecting boss 100 on the inner surface of the leg 57, and is hingedly connected thereto by a headed cross pin 102. At the other end of the link 98, a pointed element 103 projects axially therefrom, and this pointed element has the point 97 at its end. Intermediate the ends of the link 98, a worm-type pinion 104 is mounted for rotation relative to the link on a stud 105 which extends through the link and is secured thereto.

A second link 106, like the link 98, has a bifurcated end portion which straddles a projecting boss 107 on the inner surface of the leg 56 and is hingedly secured to that leg by fastening means such as a headed cross pin 108. At its other end the link 106 has an integral arcuate element 109 which is disposed in concentric relationship to the point 97 and has teeth 110 on the surface opposite the point 97 which engage and coact with the worm-type pinion 104.

With this structure and arrangement of parts, the geometric principles are like those illustrated and described in connection with the diagram of Fig. 7. On the other hand, the adjustment of the spacing between the points 70 and 72 is effected by manually turning the worm-type pinion 104, so that it moves along the arcuate element 109 on the link 106. This arrangement of the pinion and arcuate element not only tends to hold the points in an adjusted relationship relative to one another, but also moves the position of the point 97 so that it remains in aligned relationship and in a fixed relationship of spacing between the points 70 and 72 on the legs 56 and 57.

The modification of my invention which is depicted in Figs. 19 to 22 inclusive, also has geometric characteristics which correspond to the diagrammatic illustration of Fig. 7. In this structure, however, side legs 112 and 113 are hingedly connected for relative swinging movement in substantially coplanar relationship toward and from one another by a headed cross pin 114, or other suitable means. At the mid-portions of the legs 112 and 113, links 115 and 116 are connected thereto for relative swinging movements in a plane parallel to that of the movements of the legs 112 and 113 by fastening means, such as headed cross pins 117 and 118. These links 115 and 116 extend beyond the legs 112 and 113 and are of practically the same length as the legs 112 and 113, with their upper ends terminating directly above the lower ends of the legs. The lower ends of the links 115 and 116 are hingedly connected together for relative swinging movement by fastening means such as a headed cross pin 119.

A long straight center pin 120 extends through the cross pin 119 and is secured thereto by an integral pointed element 122 on the lower end thereof providing a center point 123. At its upper end the pin 120 extends through the cross pin 114, and that cross pin is slidable along the pin 120 when the legs are moved toward and from one another. At its upper end, a knurled knob 124 is secured to the pin 120. Side pins 125 and 126 are hingedly secured to the lower ends of the legs 112 and 113 through fastening means such as headed cross pins 127 and 128 respectively. Pins 125 and 126 have pointed elements 129 and 130 respectively at their lower ends, which pointed elements provide points 132 and 133 on the legs 112 and 113 respectively. At the upper ends of the links 115 and 116, rotatable and sliding connections are provided between the links and the upper ends of the pins 125 and 126 respectively by means such as headed cross pins 134 and 135. These headed pins 134 and 135 slide along the pins 125 and 126 as the legs and links are moved toward and from one another. As depicted in Figs. 20 and 21, the links 115 and 116 and the legs 112 and 113 have parallel side portions of similar structure and in opposed relationship which straddle the respective cross pins.

While I have illustrated preferred and modified embodiments of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

A three point divider comprising, in combination, two relatively rigid legs hingedly connected together for relative angular swinging movements toward and from one another about an axis which is substantially perpendicular to both legs and fixed in position on both legs, relatively rigid links each having one end hingedly connected to the mid-portion of one of the legs for swinging movements about an axis substantially parallel to the first mentioned axis, means connectting the other ends of said links for angular movements relative to one another as the legs are moved toward and from one another, pointed elements secured to the unconnected ends of each of the legs at positions such that each of the points of the pointed elements is in a straight line relationship with the first mentioned axis and the axis of connection of one of the links to the leg upon which the pointed element is secured, hingedly connected auxiliary links, an arcuate element having portions along which each of said first named links is longitudinally movable, a third pointed element connected to said first named links through the hingedly connected auxiliary links and the arcuate element so that the point thereof is aligned with the points of the pointed elements on the legs, and said legs, links and axes being so relatively disposed that a straight line connecting the point on the third pointed element to the axis of the hinge connection between one of said first named links and one leg is parallel to the straight line connecting the axes and point of the pointed element on the other leg.

References Cited in the file of this patent

UNITED STATES PATENTS

| | | |
|---|---|---|
| 341,714 | Albert | May 11, 1886 |
| 416,205 | Woodworth | Dec. 3, 1889 |
| 613,814 | Benes | Nov. 8, 1898 |
| 723,720 | Ostlund | Mar. 24, 1903 |
| 772,334 | Bornheimer | Oct. 18, 1904 |
| 829,938 | Cote | Aug. 28, 1906 |
| 953,026 | Evans | Mar. 29, 1910 |
| 1,140,844 | Novak | May 25, 1915 |

FOREIGN PATENTS

| | | |
|---|---|---|
| 877,671 | Germany | May 26, 1953 |